United States Patent Office 3,108,077
Patented Oct. 22, 1963

3,108,077
OXIDIZING SCOURING CLEANSER AND
PROCESS OF PREPARING SAME
Harold Eugene Wixon, Jersey City, N.J., assignor to Colgate-Palmolive Company, New York, N.Y., a corporation of Delaware
No Drawing. Filed Mar. 17, 1960, Ser. No. 15,537
6 Claims. (Cl. 252—95)

The present invention relates to an oxidizing scouring cleanser containing stabilized dichlorocyanuric acid and to a process of use thereof. More particularly it relates to a solid particulate scouring cleanser composition containing dichlorocyanuric acid stabilized against decomposition, to a method of preparing such compositions, and to a process of using such compositions. The present compositions are characterized by stability against loss of oxidizing power on aging and storage.

An oxidizing scouring cleanser in accordance with the present invention comprises a major proportion of a water insoluble abrasive and a minor proportion of a particulate mixture of a water soluble organic surface active agent, and as an oxidizing agent, solid particulate dichlorocyanuric acid stabilized against decomposition by a substantially odorless olefin having a double bond containing a tertiary carbon atom. Also within the scope of the instant invention is a method for the preparation of such compositions in accordance with which solid particulate dichlorocyanuric acid is admixed with a substantially odorless olefin having a double bond containing a tertiary carbon atom in the presence of a water insoluble abrasive. The invention further includes a process for cleaning and bleaching a soiled and stained vitreous surface which involves slurrying the instant scouring cleanser with water and immediately thereafter scouring such soiled and stained surface.

The dichlorocyanuric acid of the present invention is in a substantially dry, finely divided solid form, i.e., in a form suitable for dissolution in water so as to thereupon release its available chlorine. Typically the particle size of this material is such that substantially all of it passes through a 20 mesh screen (i.e. the particle diameter is less than about 0.84 mm.). Preferably a major portion (i.e. 60–90%) thereof has an average particule diameter of less than about 0.074 mm. and passes through a 200 mesh screen ("mesh" being used herein to refer to the U.S. sieve series). By means of the present invention, it is possible to prepare oxidizing scouring cleansers containing solid, particulate dichlorocyanuric acid stabilized against decomposition on aging in contact with small amounts of moisture or other degradative material normally sufficient to cause decomposition of the acid and loss of available chlorine therefrom. It is noteworthy that although the instant olefins stabilize dichlorocyanuric acid against decomposition on storage and ageing, on contact with an aqueous liquid medium in gross amount (as in forming an aqueous paste or slurry of the cleanser which permits dissolution of the acid in water), the dichlorocyanuric acid readily liberates its available chlorine and brings about highly effective oxidative bleaching. Thus it is now possible to maintain a high level of available chlorine in scouring compositions containing dichlorocyanuric acid over a relatively long period of time and under conditions which would otherwise cause the dichlorocyanuric acid to decompose and suffer a substantial loss of available chlorine, and yet to do this in such a manner that the oxidizing power of the product is readily available on use in an aqueous system. Stabilization of the dichlorocyanuric acid employed in scouring cleansers in accordance with the present invention has also been found to be highly advantageous in that it results in diminution of corrosion of metallic containers in which scouring cleanser is stored.

The instant olefins have a carbon-to-carbon double bond in which one of the carbon atoms is tertiary, i.e. is directly attached to a total of 3 carbon atoms, one sharing the double bond and two others in addition. The unsaturation of these compounds is not exclusively of an aromatic or benzenoid nature, and suitable olefins may be cyclic or acyclic, e.g. paraffinic or cycloparaffinic, and the tertiary carbon-containing double bond may be terminal (in 1,2 position), or it may be non-terminal or part of a cyclic structure. The instant olefins are normally liquid or solid at room temperature and pressure, and it is preferred to employ those with a relatively low vapor pressure (e.g. having a boiling point at one atmosphere above about 125° C. and preferably in the range from 150–250° C.). The group of olefins employed in accordance with the present invention does not include the terpenes, which for the most part, are powerfully odoriferous. Use of the instant non-terpenic substantially odorless olefins is highly advantageous in a household product such as a scouring cleanser in that it permits selection of fragrances in perfuming of the product. Examples of olefins suitable for use in accordance with the present invention are polymerized isobutylene, e.g. tetraisobutylene, polymerized propylene, e.g. propylene tetramer, and 5-butyl-4-nonene such as may conveniently be prepared by dehydration of tributyl carbinol.

The instant tertiary olefins are normally employed in a minor amount sufficient to effect stabilization of the dichlorocyanuric acid but insufficient to diminish substantially the available chlorine thereof, i.e. in an amount which affords stabilization but which does not, on initial contact and mixing as set forth herein, substantially reduce the available chlorine thereof. Desirably such loss of available chlorine on mixing which is atributable to the presence of the olefin is less than about 40%, and preferably less than about 15%, i.e. about 0–3%. The exact proportion of olefin which is employed depends on the stabilizing activity of the olefin employed, which in turn is influenced by the degree of unsaturation and structure thereof. Typically the proportion of olefin employed may vary from about 1% to 40% and preferably from about 5% to 20% by weight of the dichlorocyanuric acid present, higher relative amounts of olefins being used if the olefin is monounsaturated than if the olefin has multiple nonaromatic unsaturation.

The preparation of stabilized dichlorocyanuric acid may be carried out by treating a solid particulate dichlorocyanuric acid under substantially dry conditions with the desired amount of olefin, the olefin being in a sufficiently diffuse form to prevent spontaneous thermal decomposition, e.g. fuming or smoking, of the dichlorocyanuric acid. The olefin may be in liquid or gaseous form (most preferably liquid), and may, if desired, be carried by an inert liquid, gaseous or solid carrier.

Contact of the dichlorocyanuric acid with the stabilizing olefin (either per se or on a carrier) is carried out in the presence of a dispersion medium, the expression "dispersion medium" referring to the means of dispersing the instant olefin throughout the particulate dichlorocyanuric acid so as to obtain substantial homogeneous contact of the olefin with the particles comprising the body of dichlorocyanuric acid being stabilized. Uniform, even contact of the olefin with the particulate dichlorocyanuric acid prevents undesirable extensive localized reaction between these two materials, which reaction may lead to overheating and spontaneous decomposition of the dichlorocyanuric acid. Suitable such dispersion media include substantially dry water soluble or insoluble inert solid diluents such as the instant water insoluble abrasives, ionic organic surface active agents (e.g. substantially dry particulate anionic detergent compositions such as may be prepared by spray drying), inorganic salts, and other particulate solids inert to both dichlorocyanuric acid and the instant olefins and having extensive surface area. These substances are also useful as olefin carriers as referred to hereinabove. Use of particulate solid media as carriers is especially desirable in that they diminish effectively the extent of original contact between the olefin and the dichlorocyanuric acid, they sorb the olefin at the time of addition and carry it throughout the composition and later release it to the dichlorocyanuric acid slowly and uniformly, and they inhibit uncontrolled overheating by absorbing any heat that is produced. In general it is preferred that the ratio of total inert solid diluent used as olefin carrier and/or as dispersion medium to dichlorocyanuric acid be at least about 5:1 and preferably in the range of about 100:1 to 1000:1.

More specifically, procedures for preparing the instant compositions include contacting the dichlorocyanuric acid with the olefin by tumbling a particulate mixture of dichlorocyanuric acid and a finely divided particulate abrasive while spraying the mixture with a liquid or liquefied olefin in finely divided form. Alternatively, a suitable olefin in liquid form may be slurried with a substantially dry inert solid particulate abrasive, the slurry may then be thoroughly dispersed throughout a larger body of substantially dry inert solid particulate abrasive, and finally the dichlorocyanuric acid may be admixed therewith.

Ionic organic surface active agents which may be employed in the present compositions are those water soluble ionic organic surface active agents stable in the presence of dichlorocyanuric acid. This includes a wide variety of well known anionic foaming detergents such as the water soluble higher fatty acid soaps, e.g., sodium myristate and sodium palmitate; water soluble sulfated and sulfonated anionic foaming detergent salts containing a hydrophobic higher alkyl moiety (typically containing from about 8 to 22 carbon atoms) such as alkali metal salts of higher alkyl mono- or poly-nuclear aryl sulfonates having from about 10 to 16 carbon atoms in the alkyl group (e.g. sodium, lithium, or magnesium dodecyl benzene sulfonate, potassium pentapropylene benzene sulfonate), alkali metal salts of higher alkyl naphthalene sulfonic acids, sulfated higher fatty acid monoglycerides such as the potassium salt of the sulfated monoglycerides of coconut oil and/or tallow fatty acids, alkali metal salts of sulfated fatty alcohols containing from about 10 to 18 carbon atoms (e.g. sodium lauryl sulfate and sodium stearyl sulfate); as well as numerous other ionic organic surface active agents such as sodium toluenesulfonate, sodium xylenesulfonate, sodium naphthalene sulfonate; and mixtures thereof. In general these detergents are employed in the form of their alkali metal or alkaline earth metal salts as these salts possess the requisite stability towards dichlorocyanuric acid, solubility, and low cost essential to practical utility.

Water insoluble abrasives suitable for use in the scouring cleansers of the present invention comprise finely divided particulate siliceous abrasives such as silica, feldspar, pumice, volcanic ash, diatomaceous earth, bentonite, talc, and the like, a suitable particle size therefor being from about 0.3 mm. diameter to about .001 mm. diameter and finer. In addition, the present compositions may contain other water soluble and insoluble organic and inorganic materials such as inorganic builder salts, e.g. sodium sulfate, sodium chloride, sodium silicate, alkali metal orthophosphates and polyphosphate such as monosodium phosphate, disodium phosphate, trisodium phosphate, pentasodium tripolyphosphate and tetrasodium pyrophosphate; acid salts such as sodium bisulfate or dry organic and inorganic acids such as tartaric, citric, and sulfamic acids; anticaking agents such as bentonite and magnesium silicate; ethylene diamine tetraacetic acid and its salts; desiccants such as calcium chloride and magnesium sulfate; and mixtures thereof, in addition to other materials inert to dichlorocyanuric acid. The pH of dilute aqueous slurries of the present scouring cleansers is normally within the range of 3 to 12, preferably 7-10.

The present oxidizing scouring cleanser compositions comprise a major proportion (at least 50% and preferably at least 85%) of water insoluble particulate abrasive and a minor proportion of a substantially non-abrasive material which normally constitutes a water soluble particulate mixture. By "substantially water soluble particulate mixture" it is meant to indicate that a major part of this non-abrasive portion is water soluble or dispersible. This water soluble part comprises water soluble ionic organic surface active agent, water soluble dichlorocyanuric acid, and the instant tertiary olefin, which although it may per se be water insoluble, constitutes only a minor amount of this portion and tends to be dispersed in water by the ionic organic surface active agent.

The instant scouring cleansers are substantially dry, i.e., are solid compositions which are dry to the touch and which are substantially completely devoid of free or uncombined moisture. In this connection it is preferred that the present scouring compositions contain a small proportion of hydratable inorganic salt such as incompletely hydrated, i.e., anhydrous or partially hydrated inorganic alkaline detergent builder salt, because of the affinity of such salts for moisture and their beneficial effect on bleaching efficacy. Examples of such salts are pentasodium tripolyphosphate, tetrasodium pyrophosphate, trisodium orthophosphate, sodium sulfate, and the like. Thus a typical preferred formulation will contain hydratable inorganic salt and any moisture therein (as determined by azeotropic distillation with xylol using the Dean and Stark apparatus, ASTM method D-460-54, or by the Karl Fischer tritration method) will be less than that moisture which can be strongly retained in an inactive form as the hydrate of the hydratable inorganic salt. In order to maintain the substantially dry form of the present compositions, it is desirable that these compositions be packaged in moisture impermeable materials, e.g., glass, metal or metal foil.

A preferred abrasive cleanser prepared in accordance with the present invention is substantially dry and comprises from 60% to 95% by weight of water insoluble siliceous abrasive, about 0.5 to 15% by weight of a water soluble anionic organic non-soap foaming detergent, about 0.1 to 10% dichlorocyanuric acid, the instant olefin in an amount from 5% to 20% by weight of said dichlorocyanuric acid, and optionally, up to about 25% by weight of inorganic alkali metal detergent builder salt such as those hydratable inorganic salts referred to hereinabove.

The following example is given to additionally illustrate the nature of the invention and it will be understood that the invention is not limited thereto. All parts or percentages are by weight unless otherwise indicated.

Example 1

249.805 parts of dry silica having a particle size such that 99% thereof passes through a 200 mesh sieve (sieve opening 0.74 millimeter) are mixed (by tumbling) with 9.000 parts of powdered anhydrous trisodium phosphate and 20.175 parts of a spray dried detergent composition which has an average particle diameter of less than 0.3 millimeter and which consists of 55.0% sodium dodecyl benzene sulfonate, 5.0% sodium silicate, 38.0% sodium sulfate, 1.25% moisture, and, as the balance, unsulfonated organic material and preservative. The moisture present is molecularly bound in the form of hydrates of inorganic salt.

In a separate container, 10 parts of the above-described silica are thoroughly mixed with 0.120 part of 5-butyl-4-nonene. This dispersion of stabilizing olefin in finely divided silica is then incorporated in and thoroughly distributed throughout the previously prepared mixture of silica and detergent.

In another separate container, 0.900 part of dichlorocyanuric acid are thoroughly mixed with 10 grams of the foregoing silica. The dichlorocyanuric acid employed is finely divided, a major proportion thereof (60%) passing through a 200 mesh sieve (sieve opening 0.074 millimeter). The dichlorocyanuric acid-carrying silica is then added to the olefin-containing composition and is uniformly mixed therewith by tumbling. The resulting scouring cleanser, which is substantially odorless, is substantially completely stable on exposure to 140° F. for 7 days in sealed glass containers. In contrast, a similar control composition from which the olefin has been omitted (and which, therefor, does not form part of this invention), substantially completely decomposes under these conditions.

In use, the dry powdered product of this example is sprinkled directly on stained and soiled areas of a wet vitreous surface of a kitchen sink to form an aqueous slurry. The vitreous surface is then immediately, i.e., within about 3 minutes, scoured with a wet cloth. During scouring, the cleanser slurry lathers freely and quickly and effecitvely cleanses and bleaches the surface of the sink. The cleanser is also similarly highly effective in cleansing soiled or tarnished copper bottomed cooking utensils and other metal surfaces when used in the same manner. Satisfactory results are also obtained if the surface to be scoured is dry at the time the scouring powder is applied thereto, and when the scouring powder is applied directly to the wet cloth used for scouring, as long as scouring occurs within about 3 minutes of the time of contact of the cleanser with the water and there is sufficient water on the object and/or in the cloth to dissolve or activate the dichlorocyanuric acid and form a paste or slurry with the scouring powder.

*Examples II and III*

In place of 5-butyl-4-nonene in Example I, a propylene tetramer (tetrapropylene) or tetraisobutylene may be employed with the same results in both the composition and its use.

While there has been set forth that which at present is considered to be the preferred embodiment of the invention, it will be understood, of course, that changes, modifications, and substitutions may be made therein without departing from the true scope of the invention as defined in the appended claims.

What is claimed is:

1. An oxidizing scouring cleanser consisting essentially of at least about 50% of a water insoluble siliceous abrasive, about 0.5 to 15% by weight of a water soluble anionic organic foaming detergent, and about 0.1 to 10% dichlorocyanuric acid stabilized against decomposition by a substantially odorless olefin having a double bond containing a tertiary carbon atom, said olefin being present in a small but sufficient amount to stabilize said dichlorocyanuric acid up to about 40% by weight thereof.

2. An oxidizing scouring cleanser as set forth in claim 1 wherein said olefin is 5-butyl-4-nonene.

3. An oxidizing scouring cleanser as set forth in claim 1 wherein said olefin is tetraisobutylene.

4. An oxidizing scouring cleanser as set forth in claim 1 wherein said olefin is tetrapropylene.

5. An oxidizing scouring cleanser consisting essentially of from 60% to 95% of a water insoluble siliceous abrasive, about 0.5% to 15% of a water soluble higher alkyl benzene sulfonate detergent salt, about 0.1% to 10% dichlorocyanuric acid stabilized against decomposition on storage and aging by a substantially odorless olefin having a double bond containing a tertiary carbon atom in an amount from 5% to 20% by weight of said dichlorocyanuric acid, and up to about 25% of a hydratable water soluble inorganic alkali metal detergent builder salt.

6. A process for the preparation of an oxidizing scouring cleanser which comprises contacting, on the basis of a total of 100 parts, 0.1 to 10 parts of solid particulate dichlorocyanuric acid with from 1 to 40% by weight thereof of a substantially odorless olefin having a double bond containing a tertiary carbon atom in the presence of at least about 50 parts of a water insoluble particulate abrasive, said abrasive being in physical contact with said dichlorocyanuric acid and said olefin and the weight ratio of said abrasive to said dichlorocyanuric acid being from about 5:1 to about 1,000:1, and commingling therewith about 0.5 to 15 parts of a water soluble anionic organic foaming detergent.

References Cited in the file of this patent

UNITED STATES PATENTS 2,105,407    Clark _____ Jan. 11, 1938

FOREIGN PATENTS 208,587    Australia _____ June 3, 1957